US006247598B1

(12) United States Patent

Hosaka et al.

(10) Patent No.: US 6,247,598 B1
(45) Date of Patent: Jun. 19, 2001

(54) STORAGE CONTAINER FOR INK JET RECORDING HEAD CARTRIDGE AND METHOD FOR STORING THE CARTRIDGE

(75) Inventors: Ken Hosaka, Yokohama (JP); Fumiharu Nakamura, Costamesa, CA (US); Taiji Yoshinari, Ninomiya-machi; Wataru Takahashi, Kawasaki, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/431,267

(22) Filed: Nov. 1, 1999

(30) Foreign Application Priority Data

Nov. 4, 1998 (JP) ........................................ 10-313793
Apr. 21, 1999 (JP) ........................................ 11-113636

(51) Int. Cl.7 .......................... B65D 85/30; G01D 9/00; B41J 2/175

(52) U.S. Cl. .......................... 206/723; 206/701; 206/576; 346/146; 347/87

(58) Field of Search .......................... 206/701, 723, 206/462, 576; 347/29, 86, 87, 108; 346/146

(56) References Cited

U.S. PATENT DOCUMENTS 5,074,418 * 12/1991 Buan et al. .......................... 206/576
5,131,539 * 7/1992 Karita et al. .......................... 206/462
5,231,416 * 7/1993 Teresawa et al. .......................... 346/146 X
5,244,092 * 9/1993 Karita et al. .......................... 206/462
5,279,410 * 1/1994 Arashima et al. .......................... 206/467 X
5,373,936 * 12/1994 Kawai et al. .......................... 206/576 X
5,483,266 1/1996 Nakamura .
5,667,063 * 9/1997 Abe .......................... 206/723 X
5,934,475 * 8/1999 Itikake et al. .......................... 206/722
6,062,390 * 5/2000 Nakamura .......................... 206/576
6,097,407 * 8/2000 Terasawa et al. .......................... 206/723 X

FOREIGN PATENT DOCUMENTS 514632 11/1992 (EP) .
626264 11/1994 (EP) .
845362 6/1998 (EP) .
3-176156 7/1991 (JP) .
6-040043 2/1994 (JP) .
6-183028 7/1994 (JP) .
7-017056 1/1995 (JP) .
7-125232 5/1995 (JP) .

* cited by examiner

*Primary Examiner*—Bryon P. Gehman
(74) *Attorney, Agent, or Firm*—Fitzpatrick, Cella, Harper & Scinto

(57) ABSTRACT

A storage container for sealingly carrying an ink jet recording head cartridge having an ink jet recording head having the discharge orifices for discharging the ink and a mounting portion for mounting an ink tank replaceably. The ink jet recording head cartridge comprises a storage tank, mounted on the mounting portion, having a negative pressure producing member accommodating chamber having a negative pressure producing member for producing the negative pressure, with an atmosphere communicating portion for communicating to the outside, and a sealed chamber having a communicating portion for communicating to the negative pressure producing member accommodating chamber and forming a sealed space from the outside, except for the communicating portion, with a sealing member for sealing the discharge orifices.

13 Claims, 12 Drawing Sheets

STORAGE CONTAINER FOR INK JET RECORDING HEAD CARTRIDGE AND METHOD FOR STORING THE CARTRIDGE

BACKGROUND OF THE INVENTION

1. Field of the Invention

The present invention relates to a shipping package for an ink jet recording head (hereinafter referred to as a recording head) to be mounted detachably on an ink jet recording apparatus, which is in sales mode usable for transport and storage in sealed state, as well as for selling, and more specifically to the transport and storage for a recording head cartridge which can be freely mounted on or demounted from an ink tank for storing the ink to be supplied to the recording head.

2. Related Background Art

An ink jet recording apparatus performs the recording of characters and images on the recording medium such as paper by discharging the liquid ink from the discharge orifices (discharge ports) of a recording head, in which the recording head for use on the recording apparatus is largely classified into two types: permanent and disposable.

The recording head of permanent type is one in which the head is already incorporated in the recording apparatus at the shipping of the apparatus, and can be replaced by the serviceman only when the apparatus breaks down. Such recording head of permanent type is frequently transported or stored with a cap placed over the discharge orifices of the recording head filled with the recording ink or preservation liquid.

Also, the recording head of disposable type can be further divided into an integral head cartridge having an ink tank for holding the ink to be supplied to the recording head integrally at any time, and a tank separable head cartridge having a tank holder as a tank mounting portion on the recording head, two of which are separable as required. In either case, the operator can replace the head by changing to a new cartridge as required.

For transportation and storage of the integral head cartridge, refer to, for example, Japanese Patent Application Laid-Open No. 3-176156 by the present applicant. In the above publication, there is disclosed a constitution in which the ink is filled within the tank, and the discharge orifices of the recording head and an atmosphere communicating opening provided on the ink tank are both sealed.

On the contrary, for transportation and storage of the separable head cartridge, there is known Japanese Patent Application Laid-Open No. 6-183028 by the present applicant, proposing that the head and the tank are separately provided, because if the head to be replaced is mounted with a replaceable tank and packaged as one piece, the evaporated ink constituents may stick to the contact portion with the recording head which is an electrical connection with the recording apparatus, resulting in degradation of the recording head. In the above publication, it is also disclosed that a humidity preserving member is used against evaporation through a gap between a head handling member and the head, and that the ink or preservation liquid is filled within the head, and the discharge orifices are sealed by a seal member and a cap member. Also, in the Japanese Patent Application Laid-Open No. 7-17056, there is disclosed a transport and storage method in which the head having the ink filled is contained in a sealed package having the inert gas filled.

On the other hand, a simple ink tank which holds the ink to be supplied to the recording head is proposed and practically used in which a negative pressure producing chamber for producing a negative pressure to the recording head and an ink reserving chamber for directly reserving the ink are integrated via a communicating portion, in order to increase the ink storing efficiency and the use efficiency of the ink tank.

The examples are Japanese Patent Application Laid-Open No. 7-125232, disclosing an invention that a negative pressure producing member around an atmosphere communicating opening to be tightly enclosed is made an area where the ink is not held, and Japanese Patent Application Laid-Open No. 6-40043, disclosing an invention of a partition wall having a structure for promoting the exchange between the air and the liquid. In the above publication, there is also disclosed a simple ink tank in sales form for sealing both an atmosphere communicating opening for communicating the inside of a negative pressure producing chamber to the atmosphere and an ink supply opening for supplying the ink to the outside such as a recording head, which is an excellent invention.

By the way, the ink jet recording apparatus is demanded with the capability of recording on various recording media at higher precision in recent years.

Therefore, the number of ink tanks to be mounted on the recording apparatus, as well as the kinds of ink to be reserved within the tank, tend to increase, and correspondingly, the tank separable head cartridges as above mentioned with the ability of mounting in one cartridge a plurality of ink tanks at the same time are increasing. Also, in order to reduce the number of replacing the replaceable ink tank, the ink tank itself tends to be bigger. Therefore, since the mounting portion for the replaceable ink tank becomes bigger, the occupied size of head cartridge itself increase.

On the other hand, in such recording apparatus, in order to increase the amount of reserving the ink to reduce the number of replacements and accomplish more compactness, it is desirable to adopt a structure having an ink reserving portion for directly reserving the ink, such as one having a negative pressure producing chamber and an ink reserving chamber integrated in the replaceable ink tank.

Such a large-sized head cartridge, with the discharge orifices sealed with well-known sealing means consisting of a seal member and a cap, like the conventional art, and having the ink filled inside thereof, was sealingly packaged in a blister pack, as described in Japanese Patent Application Laid-Open No. 3-176156, in which there was a phenomenon that the discharge performance was depressed in the early stage of use. In particular, this phenomenon was remarkably seen with the head for discharging small droplets of 20 pl or less.

The present inventors found, as a result of elucidating this cause, that the inside of the head was less hydrophilic than the conventional head cartridge, and due to this decrease in hydrophilic property, the discharge of small droplets was affected. And as a result of examining the cause of decrease in hydrophilic property, they reached a conclusion that there is a bad factor in the interrelation between the capacity of a sealed package such as a blister pack, and the content volume of head where the ink is filled. Accordingly, based on this knowledge, they recognized that it was important to propose the sales form of optimal recording head.

On the other hand, if a head cartridge having mounted the ink tank as above described as a replaceable tank for the head cartridge on the tank holder and sealed the discharge orifices of the recording head with well-known sealing means was sealingly stored within a blister pack, there was a new problem that the leakage of ink occurs from the discharge orifice face, due to expansion of the gas within the ink tank tightly closed.

SUMMARY OF THE INVENTION

It is an object of the present invention to provide a storage container for a recording head and a storage method thereof, in which even if a separable head cartridge which makes effective use of the limited space by using an ink tank having integrated a negative pressure producing chamber and an ink reserving chamber as a replaceable tank becomes bigger, the print performance of the recording head is not degraded.

It is another object of the invention to provide, based on the new knowledge as above described, a storage container for a recording head, in which even if a separable head cartridge which makes effective use of the limited space by directly reserving the ink becomes bigger, the leakage of ink does not occur during transportation, and the print performance of the recording head is not degraded.

In order to accomplish the above-mentioned objects, a storage container for an ink jet recording head cartridge according to the present invention, the storage container carrying sealingly the ink jet recording head cartridge comprising an ink jet recording head having the discharge orifices for discharging the ink and a mounting portion for mounting an ink tank replaceably, is characterized in that said ink jet recording head cartridge comprises a storage tank, mounted on said mounting portion, having a negative pressure producing member accommodating chamber having a negative pressure producing member for producing the negative pressure and an atmosphere communicating portion for communicating to the outside, and a sealed chamber having a communicating portion for communicating to said negative pressure producing member accommodating chamber and forming a sealed space from the outside, except for said communicating portion, with a sealing member for sealing said discharge orifices, said storage tank comprising said negative pressure producing member accommodating chamber communicating to the inside of the storage container through said atmosphere communicating portion, only the negative pressure producing member of said negative pressure producing member accommodating chamber holding, as the amount of ink to be supplied to the head, more than the amount of ink corresponding to the amount of saturated vapor within said storage container, and said ink being filled in said recording head.

A storage container for an ink jet recording head cartridge according to another form of the present invention, the storage container carrying sealingly the ink jet recording head cartridge comprising an ink jet recording head having the discharge orifices for discharging the ink and a mounting portion for mounting an ink tank replaceably, is characterized in that said ink jet recording head cartridge comprises a storage tank, mounted on said mounting portion, comprising a negative pressure producing member accommodating chamber having a negative pressure producing member for producing the negative pressure, and having an atmosphere communicating portion for communicating to the outside and a supply opening for communicating to said recording head, and a sealed chamber having a communicating portion for communicating to said negative pressure producing member accommodating chamber and forming a sealed space from the outside, except for said communicating portion, with a sealing member for sealing said discharge orifices, said storage tank comprising said negative pressure producing member accommodating chamber communicating to the inside of the storage container through said atmosphere communicating portion, only the negative pressure producing member of said negative pressure producing member accommodating chamber producing the negative pressure to said recording head, and holding the ink so that said sealed chamber can substantially secure the communicating state to the inside of said storage container through said atmosphere communicating portion.

A storage container for an ink jet recording head cartridge according to a further form of the present invention, the storage container carrying sealingly the ink jet recording head cartridge comprising an ink jet recording head having the discharge orifices for discharging the ink and a mounting portion for mounting an ink tank replaceably having an ink storing portion for directly storing the ink, the supply of the ink from said ink tank to said ink jet recording head being performed via an ink supply tube provided on said mounting portion, is characterized in that said ink jet recording head cartridge comprises a storage member, unlike said ink tank, mounted on said mounting portion with said negative pressure producing member in direct contact with said supply tube, having a negative pressure producing member accommodating chamber accommodating a negative pressure producing member for producing the negative pressure and having an atmosphere communicating portion for communicating to the outside, with a sealing member for sealing said discharge orifices, said negative pressure producing member holding more than the amount of ink corresponding to the amount of saturated vapor within said storage container, said ink held in said negative pressure producing member being filled in said recording head.

Also, a storage method for an ink jet recording head cartridge according to the present invention, the storage method for storing in a sealed space the ink jet recording head cartridge comprising an ink jet recording head having the discharge orifices for discharging the ink and a mounting portion for mounting an ink tank replaceably, is characterized in that said ink jet recording head cartridge comprises a storage tank, mounted on said mounting portion, having a negative pressure producing member accommodating chamber having a negative pressure producing member for producing the negative pressure, and having an atmosphere communicating portion for communicating to the outside and a supply opening for communicating to said recording head, and a sealed chamber having a communication portion for communicating to said negative pressure producing member accommodating chamber and forming a sealed space from the outside, except for said communicating portion, with a sealing member for sealing said discharge orifices, said storage tank comprising said negative pressure producing member accommodating chamber communicating to the inside of the sealed space through said atmosphere communicating portion, only the negative pressure producing member of said negative pressure producing member accommodating chamber producing the negative pressure to said recording head, and holding the ink so that said sealed chamber can substantially secure the communicating state to said sealed space through said atmosphere communicating portion.

The storage container and the storage method as above described make it possible to effectively prevent the ink within the negative pressure producing member accommodating chamber from leaking out of the recording head by variations in atmospheric pressure or temperature during transportation, because only the negative pressure producing member of the negative pressure producing member accommodating chamber holds the ink, the negative pressure producing member accommodating chamber communicates through the atmosphere communicating portion to the inside of the storage container forming the sealed space. Also, it is possible to prevent loss of the ink within the recording head, and suppress depression in print performance of the recording head, because the negative pressure producing member holds, as the amount of ink to be supplied to the recording head, more than the amount of ink corresponding to the amount of saturated vapor within said storage container, said ink being filled in said recording head.

Accordingly, after taking off the seal, if a replaceable ink tank separately sold (which holds the ink in each accommodating chamber) having the negative pressure producing member accommodating chamber and the ink reserving chamber integrated via the communicating portion is mounted, it is possible to achieve normal discharging without problems. It is noted that the amount of ink required to prevent loss of the ink within the recording head is practically sufficient to hold the ink to the extent that the pressure producing member can produce a negative pressure to the recording head.

Although the present invention can resolve the above-mentioned problems only with the constitution as above described, a more preferred one can be obtained by further having the following constitution, as described later in detail.

In a storage container for the ink jet recording head cartridge having a storage tank mounted on the mounting portion, it is preferable that the storage tank comprises a separation wall for forming the negative pressure producing member accommodating chamber and the sealing chamber in the storage tank, and an atmosphere introducing groove for promoting communication between the atmosphere communicating portion and the sealing chamber on the side of the negative pressure producing member accommodating chamber in the separation wall, because the sealed chamber and the inside of the storage container can be securely communicated. Or it is also possible that the storage tank comprises a separation wall for forming the negative pressure producing member accommodating chamber and the sealed chamber, and the interface which the ink held in the negative pressure producing member forms is located closer to the supply opening than the area in contact with the communicating portion.

Also, if the storage container (sealed space for effecting storage) is made deformable by variations in pressure within the container, it is possible to prevent leakage of the ink from the head more effectively by relieving the increase in internal pressure.

On the other hand, for a storage container having a storage member mounted on the mounting portion of the ink jet recording head cartridge, it is possible to prevent the storage member easily disengaging from the mounting portion by any impact applied on the recording head cartridge from the outside, if the mounting portion has an opening for keeping the storage member with a bottom wall surrounded therearound by a side wall, the height of the storage member from the bottom wall not exceeding from the top of the side wall in the state where the storage member is mounted on this mounting portion.

Also, where the storage member is carried detachably on the mounting portion by an engaging structure with the side wall making up the opening, and is provided with a lever elastically supported to release engagement of this engaging structure, if a stopper is provided for restricting the movable range of the lever in releasing the engagement, it is possible to prevent breakage of the lever when the impact is applied on the ink jet recording head cartridge from the outside. Further, where the storage member is carried detachably on the mounting portion by the engaging structure with the side wall making up the opening, and a lever elastically supported to release engagement of this engaging structure is provided on the storage member, if a storage member side wall extending toward the opening end of the mounting portion is further provided, this storage member side wall supporting the root of the lever so that the top end of the lever extends toward the top end of the storage member side wall, it is possible to easily release engagement with the lever. In addition, in order to hold the required amount of ink without increasing the height of the negative pressure producing member accommodating chamber of the storage member, a rubber member may be disposed around the ink supply tube, with the top end of the ink supply tube protruding therefrom, the negative pressure producing member accommodating chamber having a convex-shaped annular portion with which the rubber member comes into direct contact, and the ink supply tube being in direct contact with the negative pressure producing member with the top end into the opening of the annular portion.

A storage container and a storage method of the present invention are particularly effective when the size of ink droplets discharged from the discharge orifices of the recording head is 20 pl or less. Also, if the color material of the ink stored in the storage tank is water-soluble, the ink constituents within the head are condensed, resulting in the better wettability over the normal ink, making it possible to effect particularly excellent discharging in the early stage of using the head.

DETAILED DESCRIPTION OF THE PREFERRED EMBODIMENTS

The embodiments of the present invention will be described below with reference to the drawings.

First Embodiment

Figure 1:
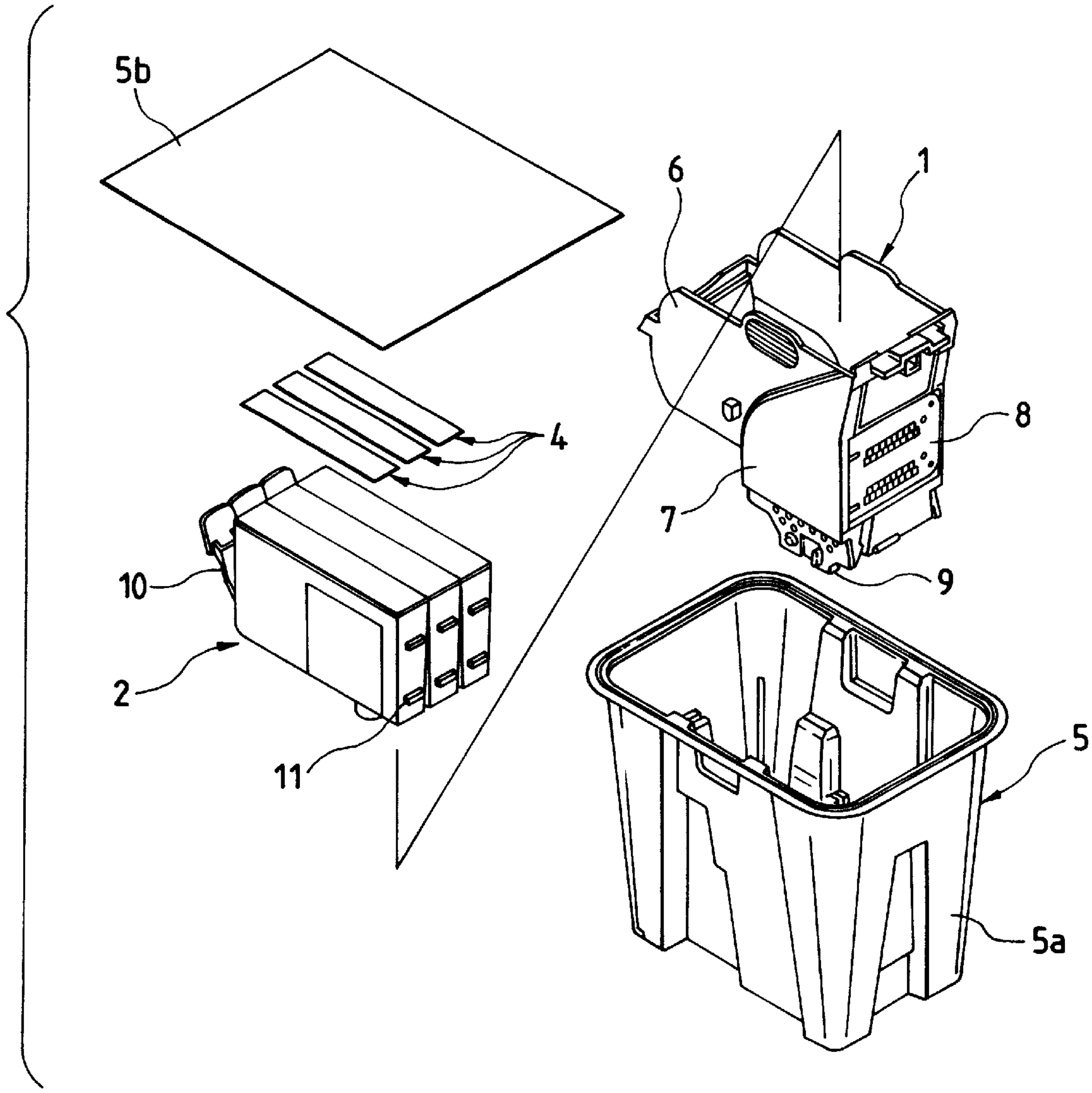
FIG. 1 is a schematic exploded perspective view for explaining a storage container according to the first embodiment of the present invention.
Figure 3:
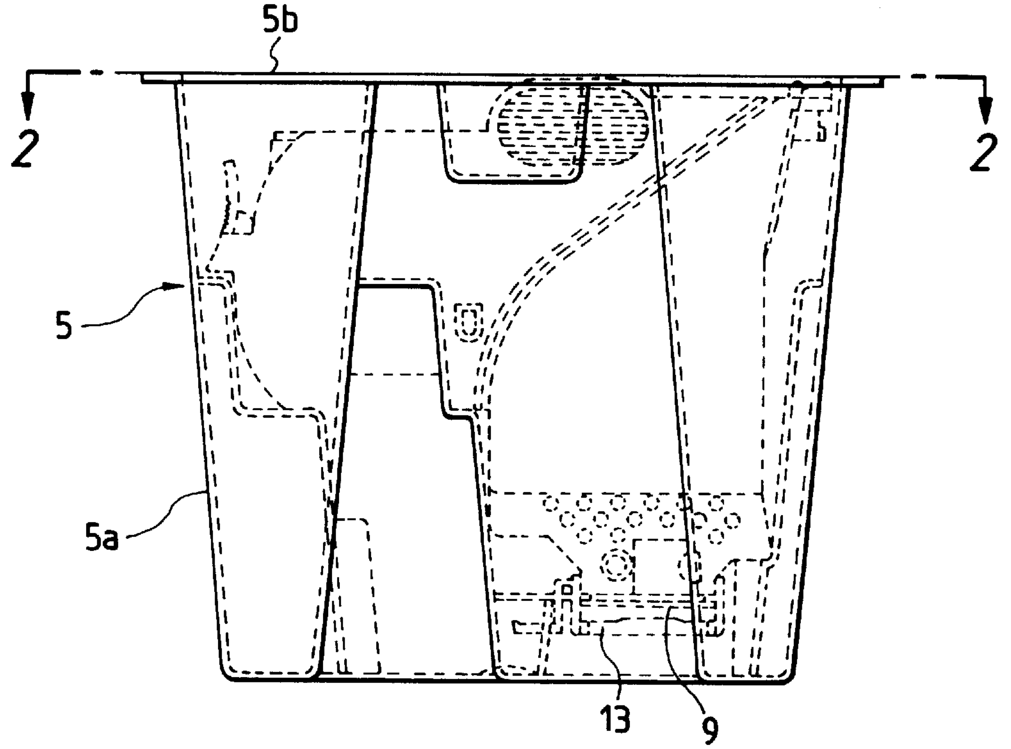
FIG. 3 is a side view of the storage container as shown in FIG. 1.

FIG. 1 is a schematic exploded perspective view for explaining a storage container according to the first embodiment of the present invention, and FIG. 3 is a side view of the storage container as shown in FIG. 1. An ink jet recording head cartridge 1 comprises a recording head unit 7 having a recording head 9 for discharging the ink and an electrical connection 8 with a recording apparatus, not shown, and a tank holder 6 as a mounting portion which can mount three (2Y, 2M, 2C) replaceable ink tanks and storage tanks 2 at the same time. The recording head 9 has internally, for example, electricity heat converters for discharging the ink from the discharge orifices, and can discharge the ink due to bubbles produced by heating of these converters. In this embodiment, there are provided two electricity-heat converters per discharge orifice so that small droplets of 20 pl or less and large droplets of about 40 pl can be appropriately discharged. By modulating the amount of discharge for such discharge droplets, the high gradation recording can be realized.

A storage container 5 is composed of a head storing container **5*a* having a flange portion at the open end and forming a storing space for storing the ink jet recording cartridge 1 and a lid member 5*b* forming a sealed space together with the head storing container 5*a* by connection with the flange portion in this embodiment. In this embodiment, the lid member 5*b* and the head storing container 5*a*** is made of PET (polyethylene terephthalate) resin and a connection portion is sealed by heat seal.

Figure 7:
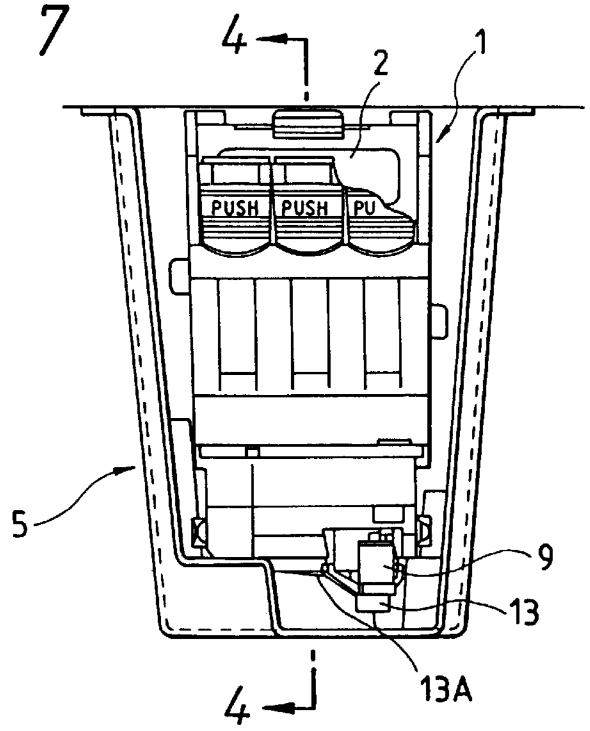
FIG. 7 is an explanatory view for explaining the side face of the storage container as shown in FIG. 1.

Herein, the ink jet recording head cartridge 1 of this embodiment has three storage tanks 2 mounted thereon, and is stored within the storage container 5 with the discharge orifices of the recording head 9 sealed by well-known sealing means such as a cap 13 and a seal 13A as shown in FIGS. 3 and 7. A storage tank 2 comprises a lever 10 having a first pawl (latch pawl) 10A (see FIG. 4) for engaging an engagement hole of the tank holder 6, and a second pawl (pawl like projection) 11 for fitting into a stopper hole of the tank holder 6.

Figure 2:
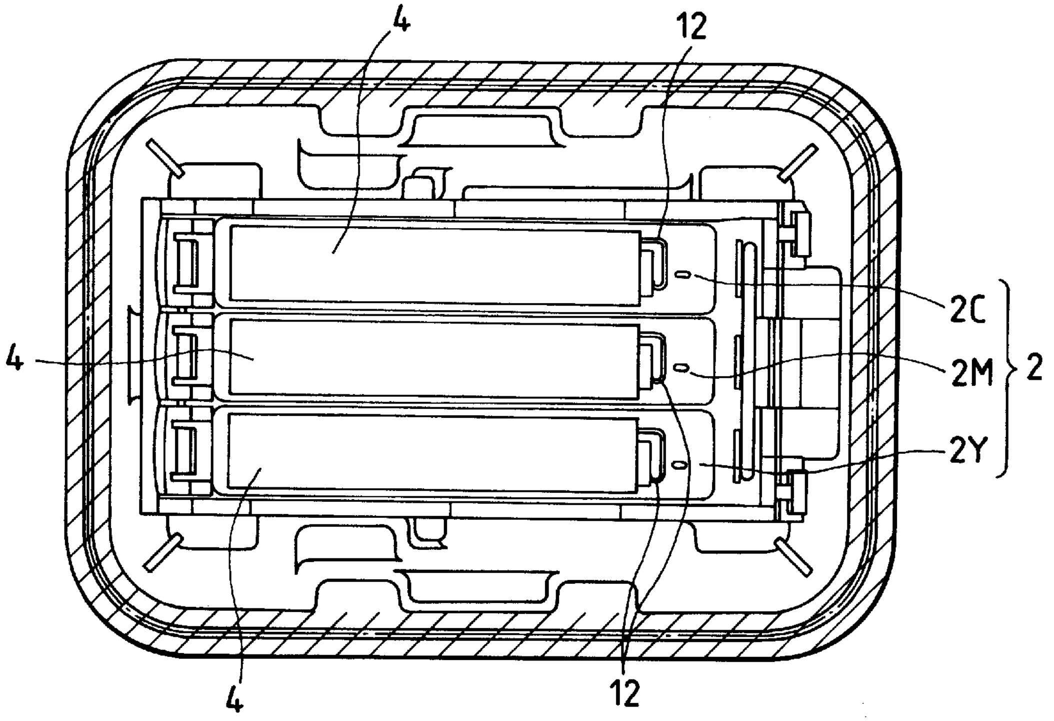
FIG. 2 is an upper view for explaining the inside of the storage container as shown in FIG. 1.
Figure 4:
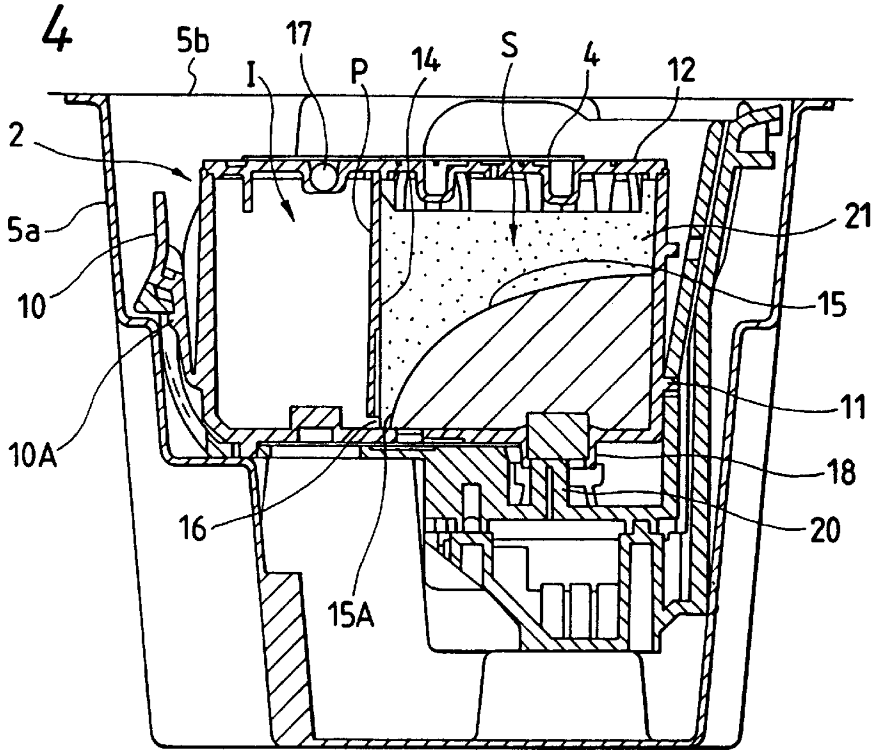
FIG. 4 is a cross-sectional view for explaining the inside of the storage container as shown in FIG. 1.

Herein, the storage tank 2 of the present invention comprises a negative pressure producing member accommodating chamber S having a negative pressure producing member 21 for producing the negative pressure as well as an atmosphere communicating portion 12 communicating to the outside and a supply opening 18 communicating to an ink supply tube 20 of the ink jet recording head cartridge 1, and a sealed space I having a communicating portion 16 communicating to the negative pressure producing member accommodating chamber S and forming a sealed space from the outside, except for this communicating portion 16, as shown in FIG. 2 (a cross-sectional view taken along 2—2 of FIG. 3) which is a upper view for explaining the interior of the storage container 5 and FIG. 4 which is a cross-sectional view taken along 4—4 of FIG. 7. It is noted that the supply opening 18 is provided with a pressure welded substance capable of producing a higher capillary force than the negative pressure producing member 21, so as to be closely contacted with the negative pressure producing member 21.

The negative pressure producing member accommodating chamber S and the sealed chamber I are partitioned by a separation wall P, and an atmosphere introducing groove 14 for promoting communication between the atmosphere communicating portion 12 and the sealed chamber I is provided on the side of the negative pressure producing member accommodating chamber S in this separation wall P.

It is noted that the storage tank 2 of this embodiment has the atmosphere communicating portion 12 formed by pasting an atmosphere communicating portion forming seal 4 on an upper portion of the tank having an opening portion on the side of the negative pressure producing member accommodating chamber S and a groove for atmosphere communication (not shown). Numeral 17 is a ball (plug) which is used to fill the ink into the sealed chamber in the replaceable ink tank as will be described later.

The storage tank 2 of this embodiment holds the ink composed of water-soluble color materials such as dyes to be used in actual printing only in an area indicated by the mesh section in FIG. 4. In this embodiment, an end face 15A of an ink interface 15 in this area is located closer to the supply opening 18 than a region in contact with the communicating portion 16. Accordingly, since the gas within the sealed chamber I is able to communicate via the communicating portion 16 from the atmosphere communicating portion 12 to a space within the storage container, it is possible to effectively prevent the ink within the storage tank 2 from leaking out of the recording head 9 due to variations in atmospheric pressure and temperature.

Figure 5:
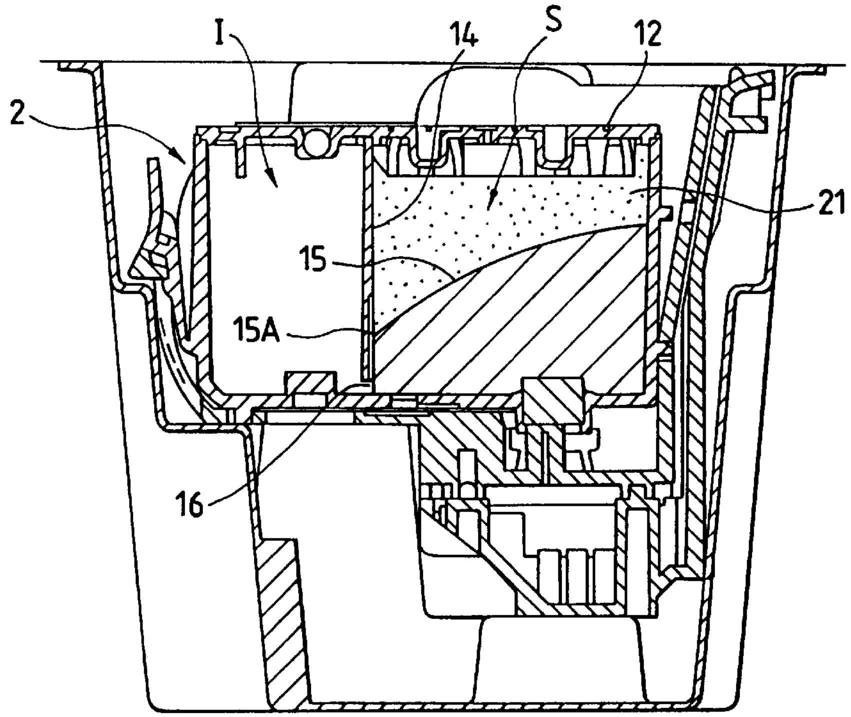
FIG. 5 is a cross-sectional view of the storage container for explaining a variation of the storage container according to the first embodiment of the invention.
Figure 6:
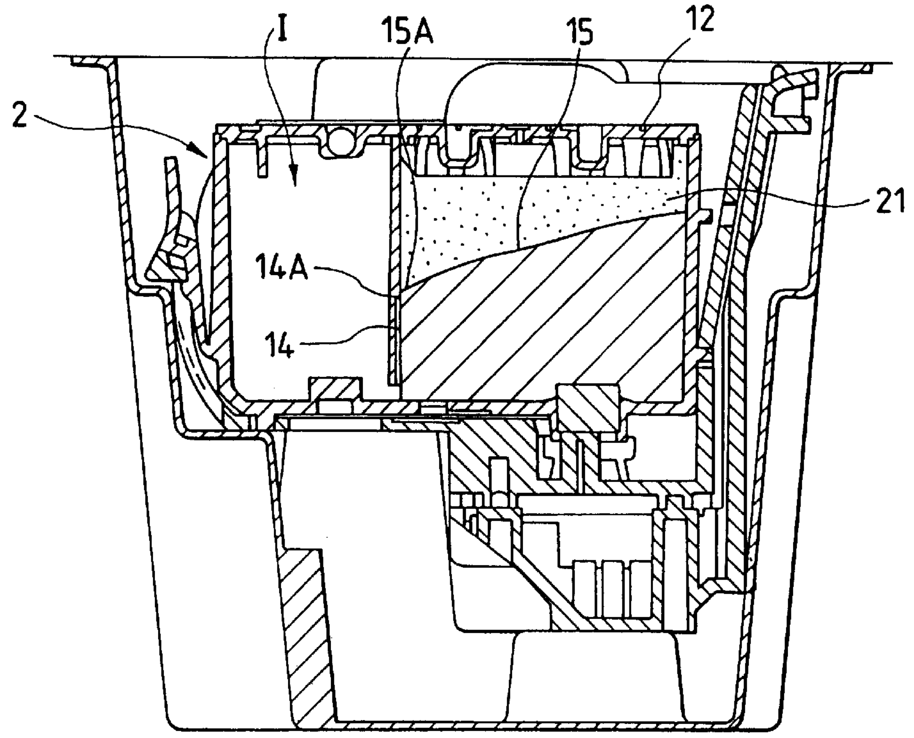
FIG. 6 is a cross-sectional view of the storage container for explaining the variation of the storage container according to the first embodiment of the invention.

Herein, the amount of ink held in the negative pressure producing member 21 and the ink interface will be supplementally described with reference to FIGS. 5 and 6. FIGS. 5 and 6 are cross-sectional views of the storage container for explaining variations of the storage container according to the first embodiment of the present invention.

In FIG. 5, the end face 15A of the ink interface 15 as above mentioned is present on the half way of the atmosphere communicating groove 14, the negative pressure producing member 21 near the communicating portion 16 holding the ink. In this case, the gas within the sealed chamber I can pass via the atmosphere introducing groove 14 from the atmosphere communicating portion 12 to a space within the storage container, so that the leakage of ink from the recording head does not occur, like the embodiment as previously described.

Also, in FIG. 6, the end face 15A of the ink interface 15 as above described is located slightly above an upper end portion 14A of the atmosphere introducing groove 14, the negative pressure producing member 21 near the communicating portion 16 and the atmosphere introducing groove 14 also holding the ink. However, the gas within the sealed chamber I can push the ink at the upper end portion 14A of the atmosphere introducing groove 14 to a space not holding the ink within the negative pressure producing member 21 (an area excluding the mesh section in the figure), thereby passing via the atmosphere introducing groove 14 from the atmosphere communicating portion 12 to a space within the storage container, in the same way of FIG. 5 as above described, so that the leakage of ink from the recording head does not occur.

In any case as shown in FIGS. 4 to 6, since only the negative pressure producing member 21 of the storage tank 2 holds, as the amount of ink to be supplied to the recording head, more than the amount of ink corresponding to the amount of saturated vapor within the storage container, and the ink is filled within the recording head, it is possible to prevent loss of the ink within the recording head, and to suppress degradation in print performance of the recording head 9. Herein, as the amount of ink within the storage tank required to prevent loss of the ink within the recording head 9, it is practically sufficient that the negative pressure producing member 21 within the storage tank 2 holds the ink enough to produce a negative pressure to the recording head 9.

To prevent leakage of the ink from the recording head 9 and loss of the ink within the recording head 9 is effective for a separable ink jet recording head cartridge 1 which can make effective use of the limited space by directly reserving the ink, even when the ink jet recording head cartridge 1 becomes larger.

It is noted that if the color materials of the ink stored within the storage tank 2 are water-soluble, the ink will evaporate into the storage container which is a sealed space, condensing the constituents of ink, so that the wettability is increased over the normal ink, making it possible to perform excellent discharging in the early stage of using the recording head, as above described.

Also, the storage container 5 (or sealed space for storage) is made deformable by variations in internal pressure within the container by, for example, reducing the thickness, thereby relieving an increase in internal pressure, and making it possible to prevent leakage of the ink from the recording head 9 more effectively.

Figure 8:
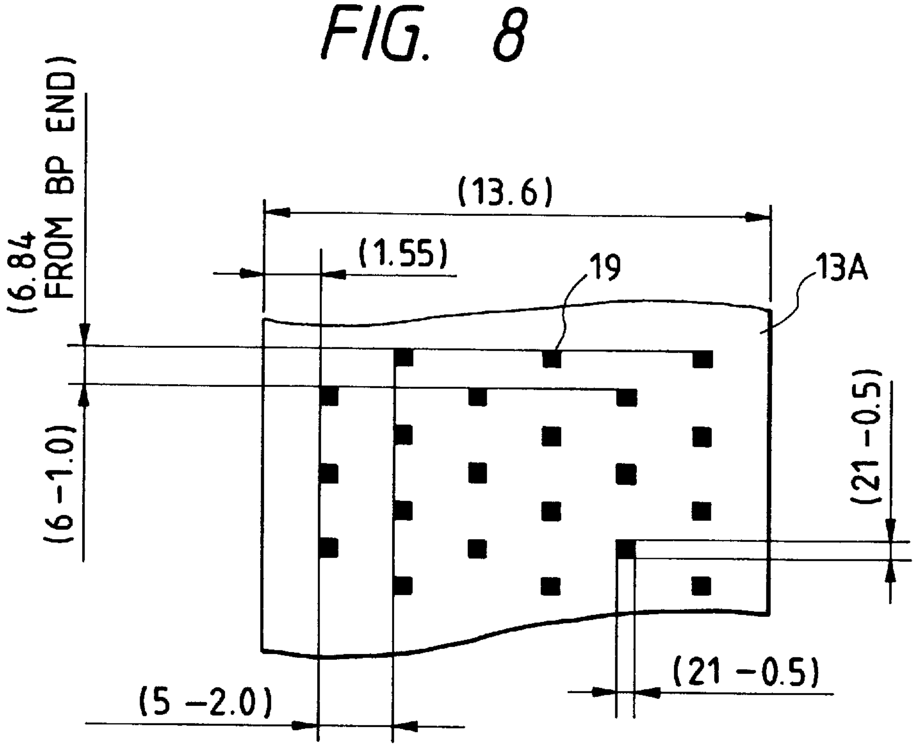
FIG. 8 is an explanatory view of a seal member for the discharge orifices of head which is preferably applicable to the present invention.

In addition, in the above-described embodiment, as the seal 13A for the discharge orifices of the recording head 9, dimples 19 (the unit of numerical values in the figure is mm) are provided, as shown in FIG. 8, to serve as adhesive parts, thereby improving the peeling ability.

While in the first embodiment as above described, three separate storage tanks 2 are prepared, it should be understood that they may be provided integrally. In this case, the lever 10 with the engagement pawls (first pawl 10A, second pawl 11) may be provided singly.

Second Embodiment

Figure 10:
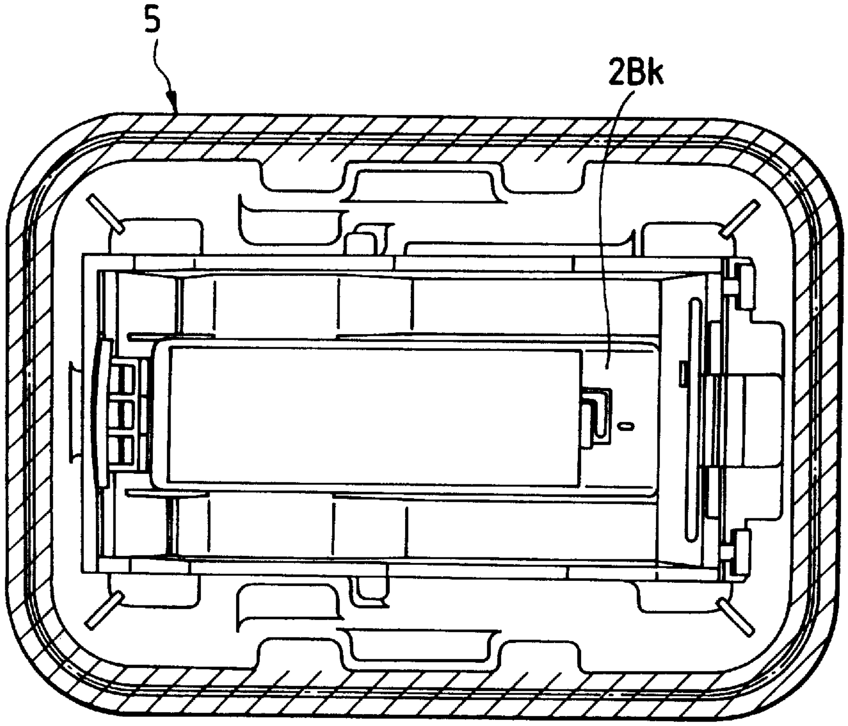
FIG. 10 is an upper view for explaining the inside of the storage container as shown in FIG. 2.
Figure 9:
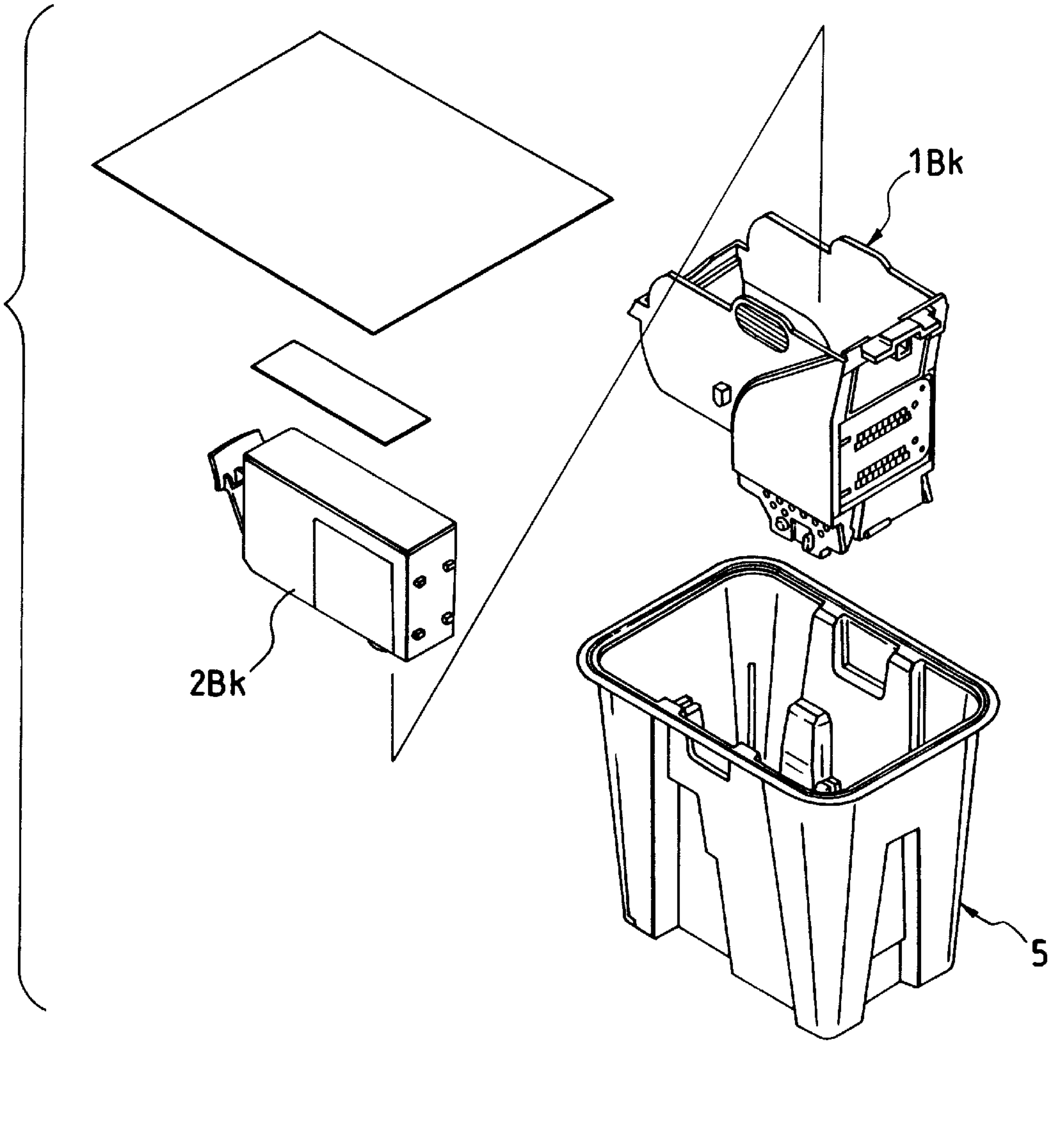
FIG. 9 is a schematic exploded perspective view for explaining a storage container according to the second embodiment of the present invention.

FIGS. 9 and 10 are a schematic exploded perspective view and an upper view for explaining a storage container according to the second embodiment of the present invention, corresponding to FIGS. 1 and 2 of the first embodiment, respectively. In the following, the same numerals are attached to the parts having the common features.

This embodiment is different from the first embodiment in that a storage container 5 is for storage of an ink jet recording head cartridge 1Bk for black corresponding to the color cartridge as previously described, only one ink tank (replaceable tank and storage tank 2Bk) is mounted on the ink jet recording head cartridge 1Bk, and has its capacity larger than the tank of the first embodiment, and the different kinds of ink are stored in the replaceable tank and the storage tank (described later in detail with a specific example).

In this embodiment, the external shape of the ink jet recording head cartridge 1Bk is made almost the same as that of the ink jet recording head cartridge 1 for color as shown in FIG. 1, whereby the storage container for the ink jet recording head cartridge of the first embodiment can be commonly used.

Third Embodiment

Figure 11:
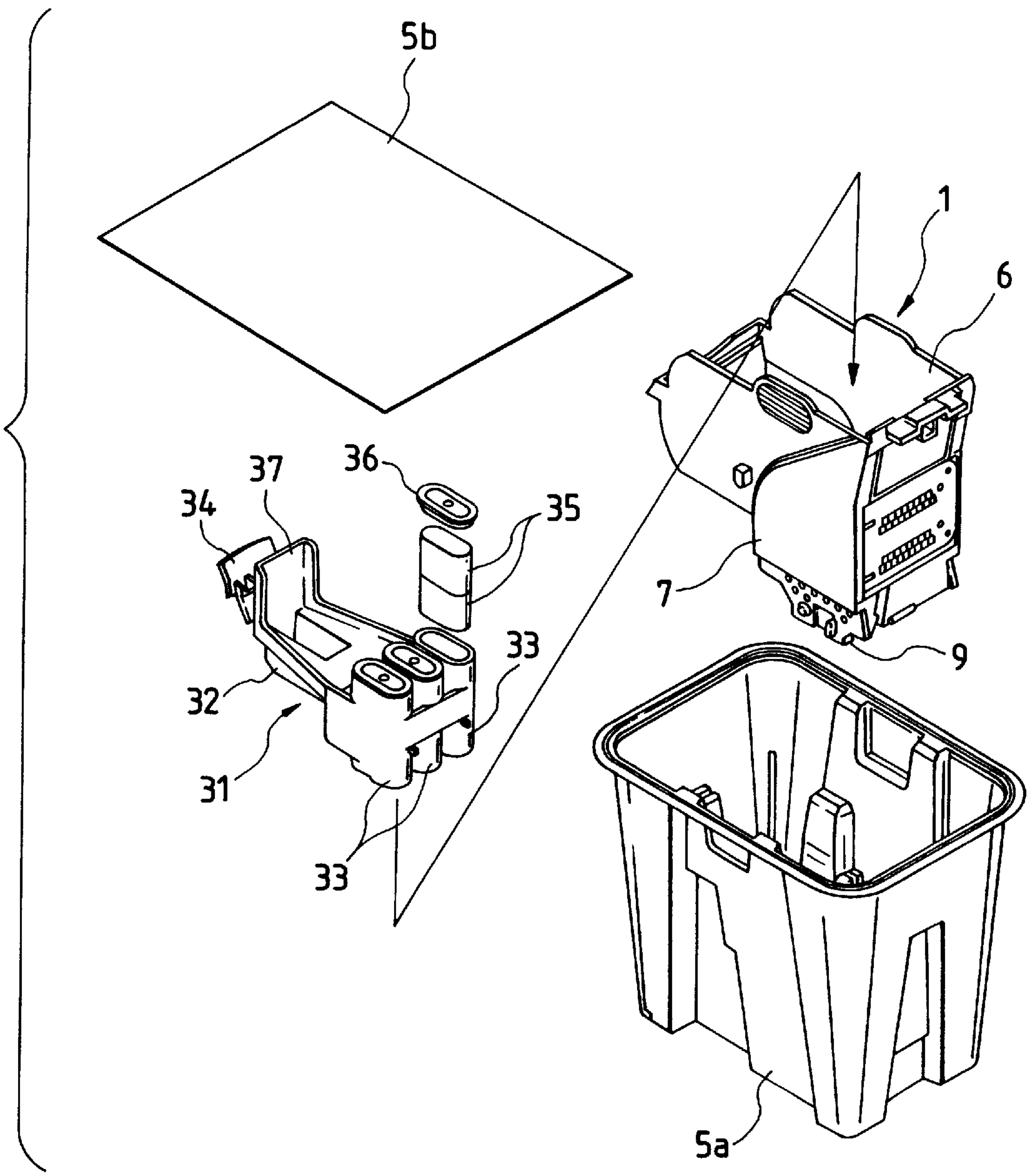
FIG. 11 is a schematic perspective view for explaining a storage container according to the third embodiment of the present invention.
Figure 12:
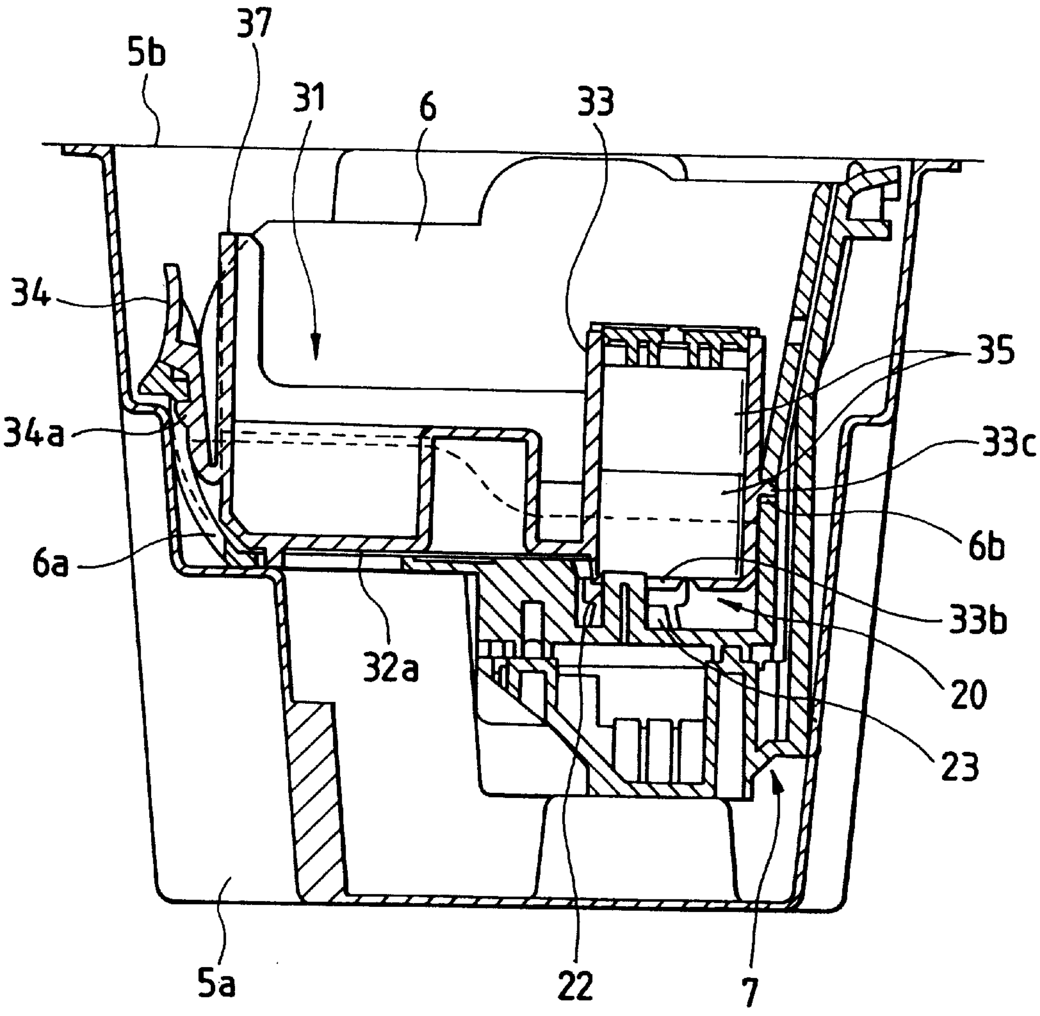
FIG. 12 is a cross-sectional view for explaining the inside of the storage container as shown in FIG. 11.
Figure 13A:
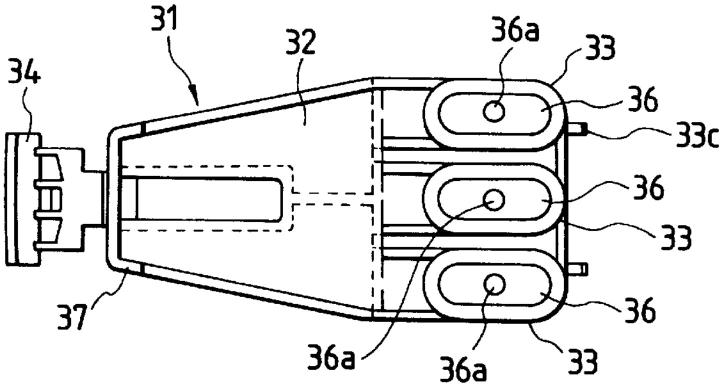
FIG. 13A is a plan view of a storage cap unit as shown in FIG. 11.
Figure 13B:
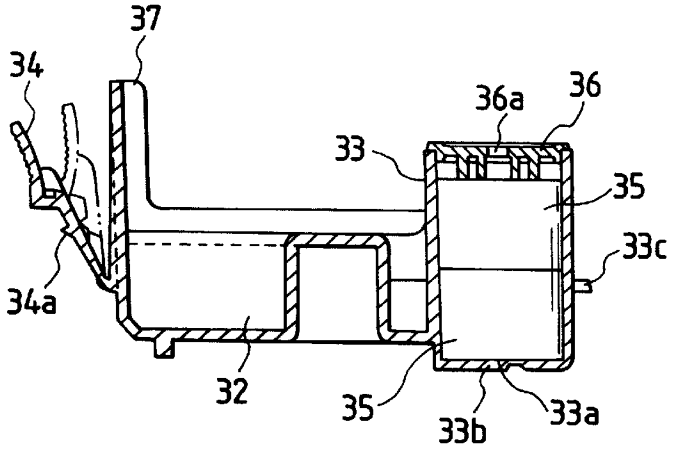
FIG. 13B is a longitudinal cross-sectional view.
Figure 13D:
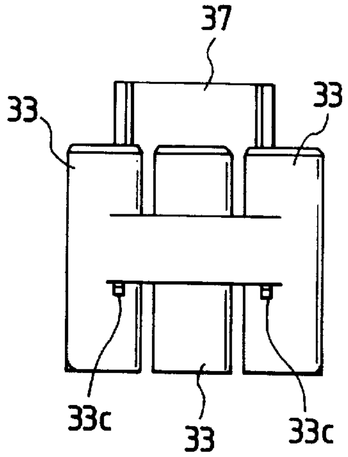
FIG. 13D is a right side view.
Figure 13C:
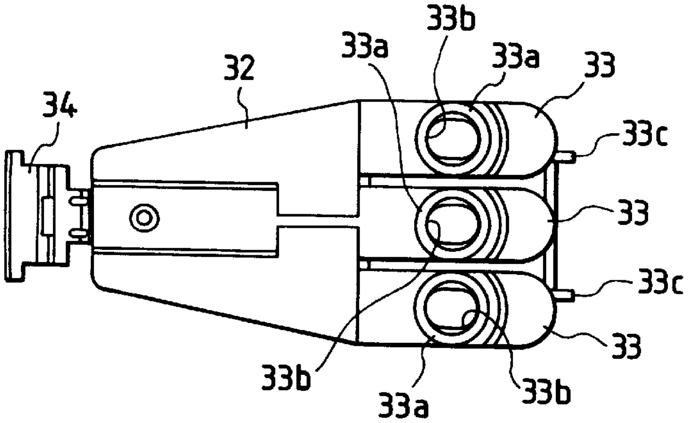
FIG. 13C is a bottom view.
Figure 14A:
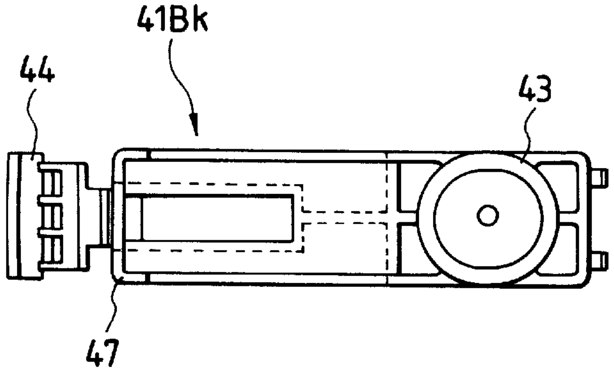
FIG. 14A is a plan view of a storage cap unit as used in the storage container of the ink jet recording head cartridge for black according to the third embodiment of the invention.
Figure 14B:
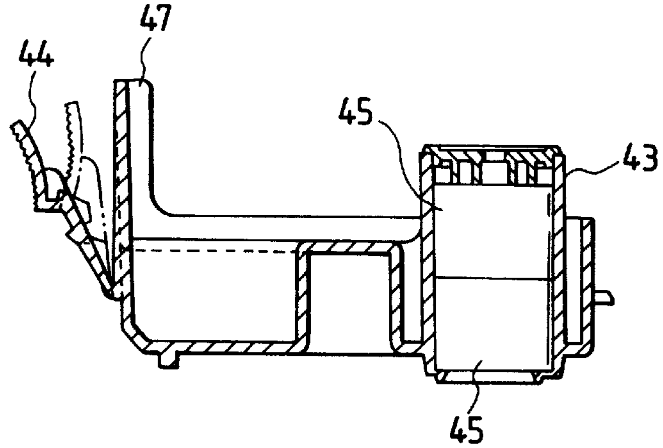
FIG. 14B is a longitudinal cross-sectional view.
Figure 14D:
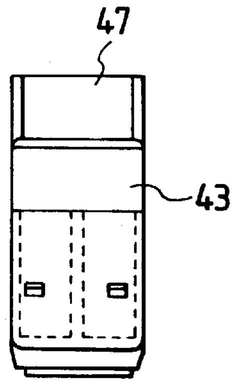
FIG. 14D is a right side view.
Figure 14C:
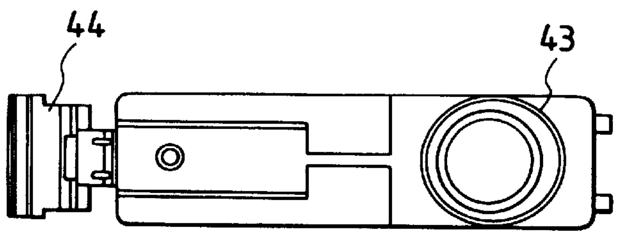
FIG. 14C is a bottom view.

FIG. 11 is a schematic perspective view for explaining a storage container according to the third embodiment of the present invention, and FIG. 12 is a cross-sectional view for explaining the inside of the storage container as shown in FIG. 11. FIGS. 13A to 13D are a plan view, a longitudinal cross-sectional view, a bottom view, and a right side view of a storage cap unit as shown in FIG. 11, respectively. The third embodiment of the present invention will be described below using the same numerals as those of the figures used in the first embodiment for the like parts of the first embodiment.

While in the first and second embodiments as previously described, the storage tank is mounted on the tank holder of the ink jet recording head cartridge, a storage cap unit 31, instead of the storage tank, is mounted as a storage member in this embodiment.

That is, a tank holder 6 of the ink jet recording head cartridge 1 which is a color cartridge for recording with the inks of three colors of cyan, magenta and yellow, has the storage cap unit 31 mounted detachably which is different from the normal ink tank (not shown) having an ink reserving portion for directly reserving the ink, to be used in the printing operation with this ink jet recording head cartridge 1, as shown in FIG. 11, wherein the storage container is constructed by carrying the ink jet recording head cartridge 1 within the head storing container 5*a*, with the opening end of the head storing container 5*a* covered with the lid member 5*b* to shut tightly the inside of the head storing container 5*a*.

The storage cap unit 31 is a further variation of the storage tank as described in the first embodiment, comprising a frame-like cap housing 32, three barrel-like negative pressure producing member accommodating chambers 33 for accommodating respective negative pressure producing members 35 internally, provided integrally at one end of the cap housing 32, and a lever 34 which is used for holding the storage cap unit 31 within the tank holder 6 by engagement with the tank holder 6, or releasing the engagement, provided integrally at the other end of the cap housing 32, as shown in FIGS. 11, 12, and 13A to 13D.

Each negative pressure producing member accommodating chamber 33 accommodates two negative pressure producing members 35 which absorb and hold the ink. A negative pressure producing member 35 is made of, for example, urethane. The amount of ink absorbed in the negative pressure producing member 35 is more than the amount of ink corresponding to that of saturated vapor within the storage container, and to the extent that the negative pressure producing member 35 can produce a negative pressure to the recording head 9, with the ink filled in the recording head 9 of the recording head unit 7, like the first embodiment. While two negative pressure producing members 35 are accommodated in one negative pressure producing member accommodating chamber 33 in this case, it is noted that its number may be one or more than two.

On a lower end face of the negative pressure producing member accommodating chamber 33, a supply opening 33*b* is opened at a position corresponding to an ink supply portion 20 (see FIG. 12) of the recording head unit 7 in the ink jet recording head cartridge 1. At the upper end of the negative pressure producing member accommodating chamber 33, a lid 36 having opened an atmosphere communicating opening 36*a* is welded together. A rib is provided on an inner wall face of this lid 36, and depresses the negative pressure producing member 35 toward the lower end so that the negative pressure producing member 35 is urged and secured to the lower inner wall of the negative pressure producing member accommodating chamber 33. It is noted that the securing method of the lid 36 is not limited to welding, as far as the lid 36 is not easily removed from the negative pressure producing member accommodating chamber 33, and may be fitting such as the press fitting, or sliding.

A lower end face of outer wall of the negative pressure producing member accommodating chamber 33 has a convex area, in which the supply opening 33*b* is formed, whereby a convex-shaped annular portion 33*a* is constructed. On the other hand, the ink supply portion 20 of the recording head unit 7 having an ink supply tube 22 with its top end entering into the supply opening 33*b* of the negative pressure producing member accommodating chamber 33 when the storage cap unit 31 is mounted on the tank holder 6, the ink supply tube 22 being surrounded by a rubber member 23, as shown in FIG. 12. The height of the rubber member 23 is lower than that of the ink supply tube 22, the top end portion of the ink supply tube 22 protruding from the rubber member 23.

The lever 34 is a member supported elastically and displaceably on a side wall 37 which is integrally provided at the other end portion of the cap housing 32, comprising a first pawl (latch pawl) 34*a* engaging an engagement hole 3*a* of the tank holder 6 provided on the side wall opposed to the lever 34, like the lever of the storage tank as described in the first embodiment. It is noted that an outer wall of the negative pressure producing member accommodating chamber 33 is provided with a second pawl (pawl-like projection) 33*c* corresponding to the second pawl 11 (see FIG. 4) provided in the storage tank as described in the first embodiment, this second pawl 33*c* engaging a stopper hole 6*b* provided on a side wall opposed to the side wall where an engagement hole 6*a* of the tank holder is provided.

When the storage cap unit 31 is mounted on the tank holder 6, it is inserted obliquely from the negative pressure producing member accommodating chamber 33 into the tank holder 6 to firstly fit the second pawl 33*c* into the stopper hole 6*b* of the tank holder 6. Then, the other end portion of the storage cap unit 31 or the end portion where the side wall 37 is provided is pushed into the tank holder 6, to force the first pawl 34*a* to engage the engagement hole 6*a* using the elastic deformation of the lever 34.

If the storage cap unit 31 is mounted on the tank holder 6, the top end of the ink supply tube 22 in the recording head unit 7 enters into the supply opening 33*b* of the negative pressure producing member accommodating chamber 33, so that the negative pressure producing member 35 is press fitted onto the ink supply tube 22. Thereby, the negative pressure producing member accommodating chamber 33 is substantially tightly shut from the outside, except for a portion onto which the ink supply tube 22 is press fitted and the atmosphere communicating opening 36*a*.

Herein, because the supply opening 33*b* is formed on the convex-shaped annular portion 33, as previously described, and this annular portion 33*a* comes into direct contact with the rubber member 23 around the ink supply tube 22, it is possible to close tightly between the negative pressure producing member accommodating chamber 33 and the ink supply portion 20 of the recording head unit 7. Thereby, the diameter of the negative pressure producing member 35 can be larger than the opening diameter of the supply opening 33*b*, and the required amount of ink can be held, with a simpler shape of the negative pressure producing member 35, and further by reducing the height of the negative pressure producing member 35, so that it is possible to suppress the height of the negative pressure producing member accommodating chamber 33.

In this state, the ink absorbed in the negative pressure producing member 35 is filled into the discharge orifices by suction from the discharge orifices (not shown) of the recording head 9 in the recording head unit 7, using suction means, not shown. The ink still remains in the negative pressure producing member 35 after the ink has been filled in the recording head 9.

If the ink has been filled into the discharge orifices, the ink jet recording head cartridge 1 is stored within the head storing container 5*a*, with the discharge orifices of the recording head 9 sealed with a seal member, and then the head storing container 5*a* is covered with the lid member 5*b*.

It is typically conceived to pour the ink into the negative pressure producing member 35 from the supply opening 33*b* of the negative pressure producing member accommodating chamber 33 before mounting the storage cap unit 31 onto the tank holder 6, but besides it is also possible to pour the ink from the atmosphere communicating opening 36*a* of the negative pressure producing member accommodating chamber 33 after mounting the storage cap unit 31 onto the tank holder 6.

As above described, if the storage cap unit 31 of this embodiment is mounted on the ink jet recording head cartridge 1, the negative pressure producing member 35 absorbing and holding more than the amount of ink corresponding to that of saturated vapor within the storage container comes into direct contact with the ink supply opening 22 of the recording head unit 7, wherein this recording head unit 7 is filled with the ink absorbed by the negative pressure producing member 35 from the ink supply tube 22 to the discharge orifices. Thereby, even when a separable ink jet recording head cartridge 1 which can make effective use of the limited space by directly reserving the ink becomes larger, it is possible to provide a storage container without causing leakage of the ink during transportation, and degradation in print performance of the recording head 9.

The storage cap unit 31 of this embodiment only has fundamentally the negative pressure producing member accommodating chamber 33 which holds the least amount of ink required not to degrade the print performance of the recording head 9, and an engagement structure for securing onto the tank holder 6, irrespective of the normal form of ink tank to be mounted on the ink jet recording head cartridge 1, whereby it is possible to prevent leakage of the ink and degradation in print performance of the recording head 9 with a simple and compact structure.

On the other hand, when the storage cap unit 31 is removed from the tank holder 6 to mount a normal ink tank onto the tank holder 6, first the lever 34 is pushed toward the side wall 37 to release the engagement between the first pawl 34*a* and the engaging hole 6*a*. And if the other end portion of the storage cap unit 31 is pushed up to release the fitting between the second pawl 33*c* and the stopper hole 6*b*, the storage cap unit 31 can be removed from the tank holder 6.

It is noted that the mounting or demounting procedure as above described is the same for the storage tank as described in the first and second embodiments.

While the lever 34 is supported on the side wall 37, as above described, the storage cap unit 31 of this embodiment is constructed as a whole to be lower than the upper end of the side wall making up the tank holder 6, except for the top end portion of the lever 34 and the upper end portion of the side wall 37. Thereby, when the storage cap unit 31 is mounted on the tank holder 6, the storage cap unit 31 is located within the opening of the tank holder 6, except for the top end portion of the lever 34 and the upper end portion of the side wall 37, so that the portion of the storage cap unit 31 protruding from the tank holder 6 is minimum.

As a result, if the ink jet recording head cartridge 1 taken out of the storage container or the head storing container 5*a* before breaking the seal is dropped, that is, even if an impact is applied to the ink jet recording head cartridge 1 having the storage cap unit 31 still mounted thereon from the outside, its impact is not easily applied directly to the storage cap unit 31, making it possible to prevent the storage cap unit 31 from inadvertently getting off the ink jet recording head cartridge 1.

Accordingly, in order to protect the storage cap unit 31 from the impact applied directly from the outside, it is desirable to construct the storage cap unit 31 so that all the parts of the storage cap unit 31 may be located within the opening of the tank holder 6. In other words, it is desirable that the height of the storage cap unit 31 from the inner bottom face of the tank holder 6 may not protrude from the side wall of the tank holder 6 in the state where the storage cap unit 31 is mounted on the tank holder 6. However, in this embodiment, since the storage cap unit 31 is mounted on or demounted from the tank holder 6 by manipulation of the lever 34, it is necessary that an operation portion of the lever 34 extends from the opening of the tank holder 6, considering the operability of the lever 34.

On the other hand, if an impact force is applied to the ink jet recording head cartridge 1 in the state where the ink jet recording head cartridge 1 is mounted on the storage cap unit 31, and particularly if an impact force is applied to the lever 34 of the storage cap unit 31, the lever 34 is deformed beyond the elastic region, so that the functionality of the lever may be damaged, or the lever 34 may be broken in the worst case. Thus, in this embodiment, by providing the lever 34 on the side wall 37, as above described, the side wall 37 serves as a stopper to restrict the movable range of the lever 34 in releasing engagement between the engagement hole 3*a* and the first pawl 34*a*, whereby it is possible to prevent excessive deformation of the lever 34 or breakage of the lever 34.

Also, in this embodiment, the height from a holder contact face 32*a* which is a face of the cap housing 32 coming into direct contact with the inner bottom face of the tank holder 6 to the upper end of the side wall 37 is greater than that from the holder contact face 32*a* to the top end of the lever 34, as will be seen from FIG. 12. Thereby, in removing the storage cap unit 31 from the tank holder 6, the lever 34 is pushed toward the side wall 37 to release engagement of the first pawl 34*a*, and the storage cap unit 31 is pushed up with one's fingers pressed onto the side wall 37, so that the storage cap unit 31 can be easily removed.

As previously described, in order to prevent the storage cap unit 31 from inadvertently getting off the ink jet recording head cartridge 1, it is desirable to construct the storage cap unit 31 so that all the parts of the storage cap unit 31 may be located within the opening of the tank holder 6, but in this embodiment, the side wall is provided, considering the breakage of the lever 34 or easiness of dismounting the storage cap unit 31, and the protruding portion from the opening of the tank holder 6 is suppressed to the minimum.

While the storage container for the ink jet recording head cartridge for color printing was described above, it should be understood that the constitution of this embodiment may be also applied to the ink jet recording head cartridge for black.

FIGS. 14A to 14D are a plan view, a longitudinal cross-sectional view, a bottom view and a right side view of a storage cap unit for use in the storage container of the ink jet recording head cartridge for black according to the third embodiment of the present invention, respectively.

A large difference between the storage cap unit 41Bk as shown in FIGS. 14A to 14D and the storage cap unit 31 as shown in FIG. 12 is that the storage cap unit 41Bk as shown in FIGS. 14A to 14D has only one negative pressure producing member accommodating chamber 43. Other items including the structure of the negative pressure producing member accommodating chamber 43, the amount of ink which the negative pressure producing member 45 absorbs and holds, and the provision of the lever 44 on the side wall 47 are the same as those of the storage cap unit 31 as shown in FIG. 12.

While three embodiments of the present invention were described above, a specific example will be described below using the form as shown in FIG. 1.

Specific Example

The specific numerical values of the first embodiment as previously described and shown in FIGS. 1 to 4 will be presented below. The head storing container 5*a* had a space tightly closed by the lid member 5*b*, having a height of 93 mm, the opening of upper face of 69 mm×100 mm, the bottom face of 50 mm×80 mm, and an internal volume of 410 $cm^3$ except for a concave portion. Also, the head storing container Sa was molded by PET, with its thickness of about 1 mm (there is an effect that the pressure within the tank can be relieved because it is deformable when the internal volume is increased with an increase of the internal pressure).

When the ink jet recording head cartridge 1 was stored within the storage container 5 with the cap 13 and the seal 13A attached, the residual volume of space within the storage container 5 was 375 $cm^3$. When three storage tanks 2Y, 2M, 2C of the present invention mounted on this ink jet recording head cartridge 1 was stored within the storage container 5, the residual volume of space within the storage container 5 was 300 $cm^3$.

Thus, the ink 4.0 g which was the same as that used in recording was filled into each storage tank 2Y, 2M, 2C, and each negative pressure producing member 21 of the negative pressure producing member accommodating chamber S, as shown in FIG. 4 (actually the ink of about 6 g was filled and 2 g was sucked and removed), and each storage tank 2Y, 2M, 2C was stored in the storage tank 5, with the atmosphere communicating portion 12 opened, and sealed with the lid member 5*b* (made of PET) under atmospheric pressure.

Broader Invention of the Present Invention

After this sealed storage container 5 was stored by changing the environmental conditions or retention period variously, the ink jet recording head cartridge 1 was mounted on the carriage of the printer by an operation method as will be described later, and the printing was performed, so that the discharging was excellent, and the flow into the storage container 5 was not seen. It is noted that the recording head 9 had an ink storing amount of 0.2 $cm^3$, and could discharge with the discharged droplet of 15 pl at minimum, wherein the discharging was excellent from the early stage.

Further, the same experiment as above described was conducted by changing the amount of ink to be filled in the storage tanks 2Y, 2M, 2C, and it was found that about 1 g (about 2 g for the storage tank 2Bk of FIGS. 9 and 10) should be practically minimum. This was a result after considering that the amount of ink remaining in the negative pressure producing member irrespective of discharging was about 0.5 g for the storage tanks 2Y, 2M, 2C (about 1 g for the storage tank 2Bk of FIGS. 9 and 10), and the negative pressure given to the head in the storage tanks 2Y, 2M, 2C should be able to retain the meniscus of the discharge orifices at minimum.

It is noted that the filled amount of ink was 4 g in this specific example, but practically was in a range from 3 g to 5 g at optimum. Also, the storage tank 2Bk of FIGS. 9 and 10 satisfied the state of FIG. 4, and the optimum range was from 7 g to 9 g.

Based on the above specific example, the inside of the storage container was met with a saturated vapor pressure, and the failure of discharging at the early stage could be avoided, even if the outer air conditions were varied.

For the storage tank 2Bk of FIGS. 9 and 10, presupposing the use of pigment inks for the head for black, the storage tank of the present invention can be employed to resolve another problem of fixing of the pigment which was left away. It is noted that the dye inks or clear inks, unlike the pigment inks, may be used within the storage tank.

While this specific example has the storage tanks 2Y, 2M, 2C which can be separately mounted or demounted, it should be understood that they may be integrated for mounting or demounting integrally.

Other Examples

While the example of the essential parts of the present invention was described above, another example which is preferably applicable to the present invention will be described below.

Structure of Storage Tank

First, a variation of the structure of storage tank which is applicable to the first and second embodiments will be described with reference to FIGS. 15 and 16.

Figure 15:
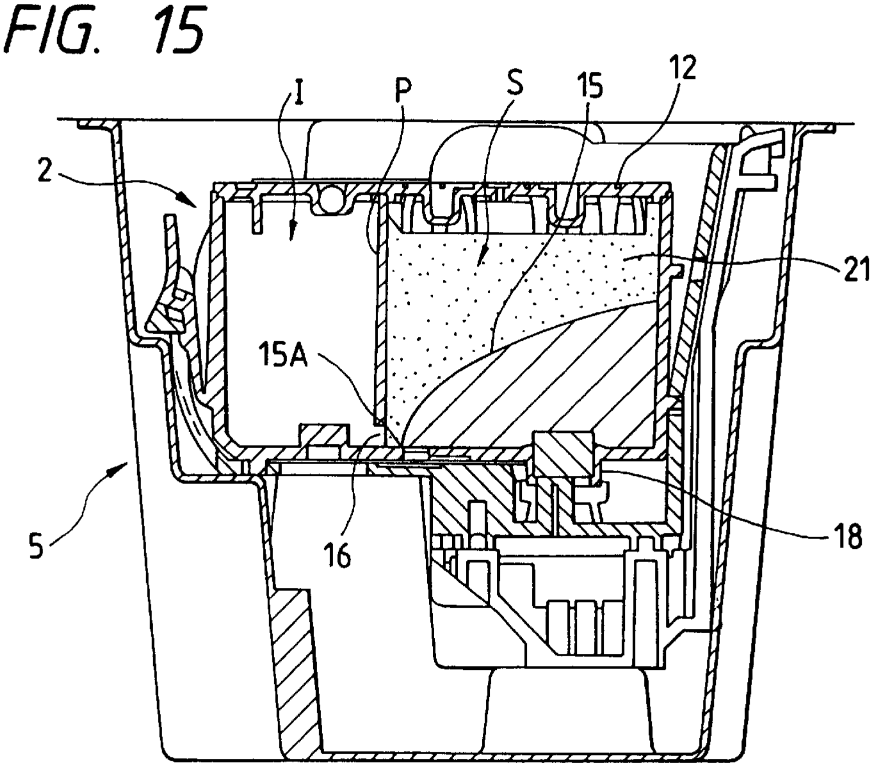
FIG. 15 is a cross-sectional view of the storage container for explaining a variation of the present invention.
Figure 16:
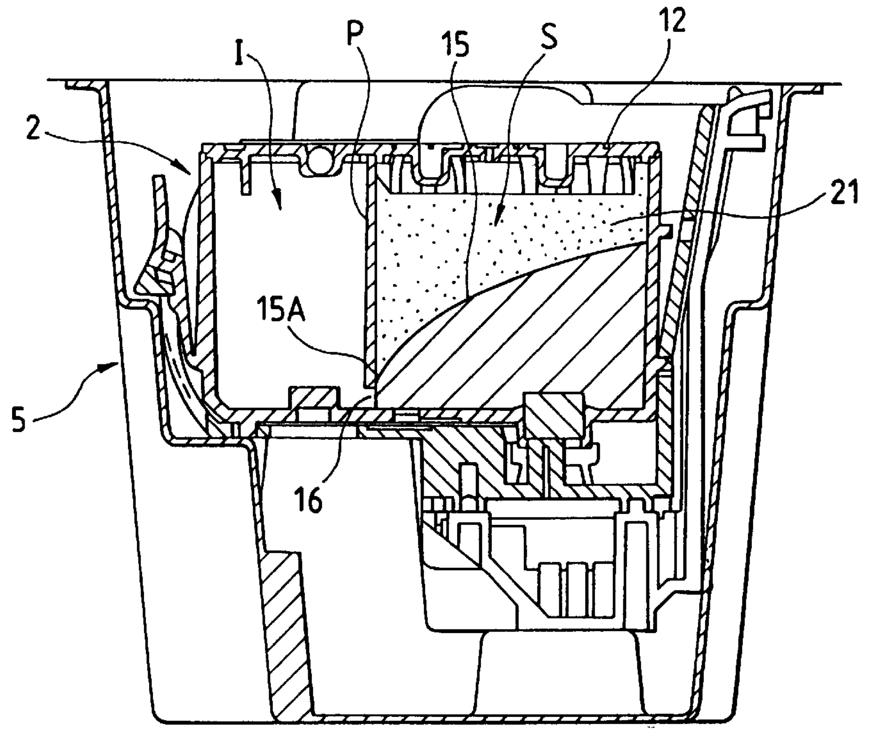
FIG. 16 is a cross-sectional view of the storage container for explaining a variation of the present invention.

FIGS. 15 and 16 are cross-sectional views of a storage container for explaining the variation of the first and second embodiments, which correspond to FIG. 4 of the first embodiment. The same numerals are attached to the like parts having the common function in the following.

This variation is different from the first and second embodiments as previously described in that the atmosphere communicating groove is not provided on the separation wall P.

In the form as shown in FIG. 15, the end face 15A of the interface 15 which the ink held in the negative pressure producing member 21 forms is located closer to the supply opening 18 than the area in contact with the communicating portion 16.

In this case, like the previous embodiments, the gas within the sealed chamber I can communicate via the communicating portion 16 from the atmosphere communicating portion 12 to the space within the storage container 5, so that it is possible to effectively prevent the ink within the storage tank 2 from leaking out of the recording head portion by variations in atmospheric pressure or temperature.

Also, in a further variation as shown in FIG. 16, the end face 15A of the interface 15 which the ink held in the negative pressure producing member 21 forms is located slightly above the communicating portion 16, the negative pressure producing member 21 near the communicating portion 16 also holding the ink. However, the gas within the sealed chamber I pushes away the ink near the communicating portion 16 to the space not holding the ink within the negative pressure producing member 21 (area except for the mesh section in the figure), and can communicate via the communicating portion 16 from the atmosphere communicating portion 12 to the space within the storage container 5, in the same way as in FIG. 15, so that the ink within the storage tank 2 will not leak from the recording head.

Thus, where the atmosphere introducing groove is not provided in the separation wall P, it is possible to effectively prevent the ink within the storage tank 2 from leaking out of the recording head by locating the interface 15 which the ink held in the negative pressure producing member 21 forms closer to the supply opening 18 than the area in contact with the communicating portion 16.

In either case of FIGS. 15 and 16, like the previous embodiments, the negative pressure producing member 21 within the storage tank holds the ink to the extent that it can produce the negative pressure to the recording head, as the amount of ink required to prevent loss of the ink within the recording head, whereby it is possible to prevent loss of the ink within the recording head.

Operation Method into Printer Carriage

The operation method in using the ink jet recording head cartridge stored within the storage container in the previous embodiments will be described below with the first embodiment.

First, the lid member 5*b* of the storage container 5 of the present invention in the packaged state as previously described is peeled off from the head storing container 5*a* and the ink jet recording head cartridge 1 integrated with the storage tank 2 is taken out.

Then, the cap 13 provided around the discharge orifices in the ink jet recording head cartridge 1 is taken off and the seal 13A which seals around the discharge orifices is removed from the discharge orifices. The ink jet recording head cartridge 1 in this state is attached on the carriage within the printer, not shown, and all the storage tanks 2 are taken out of the ink jet recording head cartridge 1.

Thereafter, each ink tank, sold separately as a component, having the same constitution as the storage tank 2, but filled with the ink all over the negative pressure producing member 21 and the sealed chamber I is mounted on the ink jet recording head cartridge 1 to perform the recording.

Head Cartridge and Replaceable Ink Tank

Finally, an example for the recording head cartridge to which the storage container of the present invention is preferably applicable and the replaceable ink tank which can be freely mounted on or demounted from its head cartridge will be presented below with reference to FIG. 17.

Figure 17:
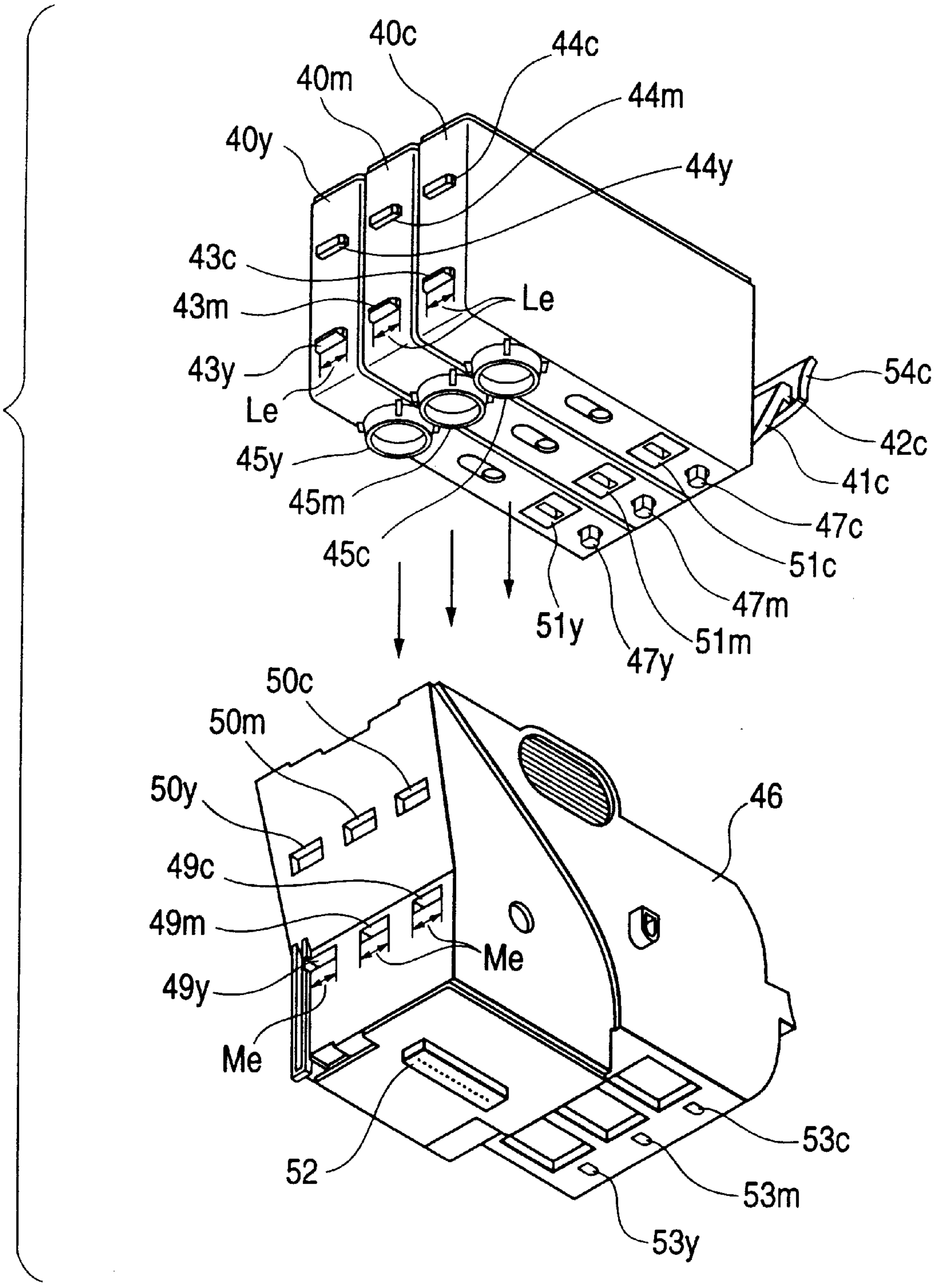
FIG. 17 is a perspective view for explaining a recording head cartridge to which the storage container of the invention is preferably applicable, and a replaceable ink tank which can be detachably replaced on the head cartridge.

The head cartridge for color as shown in FIG. 17 comprises a cyan ink tank 40*c*, a magenta ink tank 40*m*, a yellow ink tank 40*y*, and a tank holder 46 having an ink jet head and carrying each color ink tank 40*c*, 40*m*, 40*y* to be freely detachable therefrom. A movable lever 41*c*, 41*m*, 41*y* (movable lever 41*c* for the yellow ink tank 40*y* is only shown) is provided on one side face of each color ink tank 40*c*, 40*m*, 40*y*. Each movable lever has a knob 54*c*, 54*m*, 54*y* (knob 54*c* for the yellow ink tank 40*y* is only shown) and a first pawl 42*c*, 42*m*, 42*y* (first pawl 42*c* for the yellow ink tank 40*y* is only shown)

A second pawl 43c, 43m, 43y is provided on the other side face of each color ink tank 40c, 40m, 40y. Further, a third pawl 44c, 44m, 44y is provided on the other side face of each color ink tank 40c, 40m, 40y and above the second pawl 43c, 43m, 43y.

On the bottom portion of the ink tank 40c (40m, 40y), there are provided an ink supply opening 45c (45m, 45y) protruding cylindrically from the bottom face of tank, a locator pin 47c (47m, 47y) when mounting the ink tank 40c (40m, 40y) on the tank holder 46, and a prism 51c (51m, 51y) used in the ink remain detection within the tank.

A tank holder 46 provided with an ink jet head 52 is formed with a first hole (not shown) and a second hole 49c (49m, 49y) which the first pawl 42c (42m, 42y) and the second pawl 43c (43m, 43y) engage respectively when mounting the ink tank 40c (40m, 40y) on the tank holder 46. Further, the tank holder 46 is formed with a third hole 50c (50m, 50y) into which the third pawl 44c (44m, 44y) once drops for positioning in the course of mounting on the tank holder. Further, on the bottom portion of the tank holder 46, there is provided a locator hole 53c (53m, 53y) into which the locator pin 47c (47m, 47y) of the ink tank 40c (40m, 40y) is fitted.

As above described, according to the present invention only the negative pressure producing member in the negative pressure producing member accommodating chamber holds the ink, and the negative pressure producing member accommodating chamber communicates via the atmosphere communicating portion into the storage container forming the sealed space, so that it is possible to prevent effectively the ink within the negative pressure producing member accommodating chamber from leaking out of the recording head by variations in atmospheric pressure or temperature during transportation of the storage container. Also, because the negative pressure producing member holds, as the amount of ink to be supplied to the head, more than the amount of ink corresponding to the amount of saturated vapor within the storage container, and the ink is filled in the recording head, it is possible to prevent loss of the ink within the recording head and suppress degradation in print performance of the recording head.

Accordingly, after taking off the seal, if a replaceable ink tank, separately sold, having the negative pressure producing member accommodating chamber and the ink receiving chamber integrated via the communicating portion (holding the ink in each accommodating chamber) is mounted, the normal discharging can be performed without giving rise to problems. The above-mentioned effects of preventing leakage of the ink from the recording head and loss of the ink within the recording head are also obtained for the separable ink jet recording head cartridge making effective use of the limited space by directly reserving the ink, even if the ink Jet recording head cartridge becomes larger.

In particular, for the storage container having the storage tank mounted on the mounting portion of the ink jet recording head cartridge, it is possible to securely communicate the sealed chamber and the inside of the storage container by comprising a separation wall for forming the negative pressure producing member accommodating chamber and the sealed chamber in the storage tank, and an atmosphere introducing groove for promoting communication between the atmosphere communicating portion and the sealed chamber on the side of the negative pressure producing member accommodating chamber in the separation wall. Or it should be appreciated that the separation wall for forming the negative pressure producing member accommodating chamber and the sealed chamber may be provided in the storage tank, and the interface which the ink held in the negative pressure producing member forms may be located closer to the supply opening than the area in contact with the communicating portion.

Also, by making the storage container (or sealed space for storage) deformable by variations in pressure within the container, it is possible to relieve the increase in internal pressure and effectively prevent leakage of the ink from the head.

The storage container and the storage method according to the present invention are effective particularly when the size of ink droplets discharged from the discharge orifices of the recording head is 20 pl or less. While in the embodiments as above described, the recording head capable of modulating the amount of discharging the ink was described, it is needless to say that this invention is also effective for the recording head for discharging liquid droplets with a fixed amount of ink.

Also, if the color material of the ink stored in the storage tank is water-soluble, the ink constituents within the head are condensed, so that the wettability is enhanced as compared with the normal ink, making it possible to perform discharging in particularly excellent way at the early stage of using the head.

What is claimed is:

1. A storage arrangement for an ink jet recording head cartridge which includes an ink jet recording head having discharge orifices for discharging ink and a mounting portion for mounting an ink tank replaceably, said storage arrangement comprising:

a storage container for sealingly carrying the ink jet recording head cartridge;

a storage tank mounted on said mounting portion, said storage tank having a negative pressure producing member accommodating chamber which includes a negative pressure producing member for producing negative pressure and which includes an atmosphere communicating portion for communicating to the outside, and a sealed chamber having a communicating portion for communicating to said negative pressure producing member accommodating chamber and which forms a space sealed from the outside, except for said communicating portion; and a sealing member for sealing said discharge orifices;

wherein only the negative pressure producing member of said negative pressure producing member accommodating chamber holds, as an amount of ink to be supplied to the ink jet recording head, more than an amount of ink corresponding to an amount of saturated vapor within said storage container.

2. A storage arrangement for an ink jet recording head cartridge according to claim 1, wherein said storage container is deformable by variations in internal pressure of said storage container.

3. A storage arrangement for an ink jet recording head cartridge according to claim 1, wherein the recording ink jet head is constructed to discharge ink droplets of 20 pl or less from its discharge orifices.

4. A storage arrangement for an ink jet recording head cartridge according to claim 1, wherein color material of the ink stored in said storage tank is water-soluble.

5. A storage arrangement for an ink jet recording head cartridge which includes an ink jet recording head having discharge orifices for discharging ink and a mounting portion for mounting an ink tank replaceably, said storage arrangement comprising:

a storage container for sealingly carrying the ink jet recording head cartridge;

a storage tank mounted on said mounting portion, said storage tank having a negative pressure producing member accommodating chamber which includes a negative pressure producing member for producing negative pressure, an atmosphere communicating portion for communicating to the outside of said storage tank, and a supply opening for communicating to the ink jet recording head, cartridge and said storage tank having a sealed chamber which includes a communicating portion for communicating to said negative pressure producing member accommodating chamber and which forms a space sealed from the outside, except for said communicating portion; and a sealing member for sealing said discharge orifices;

wherein only the negative pressure producing member of said negative pressure producing member accommodating chamber would produce the negative pressure to the ink jet recording head, and holds ink so that said sealed chamber can substantially secure a communicating state to said storage container through said atmosphere communicating portion.

6. A storage arrangement for an ink jet recording head cartridge according to claim 5, wherein said storage tank comprises a separation wall for forming said negative pressure producing member accommodating chamber and said sealed chamber, and an atmosphere communicating groove for promoting communication between said atmosphere communicating portion and said sealed chamber on the side of said negative pressure producing member accommodating chamber in said separation wall.

7. A storage arrangement for an ink jet recording head cartridge according to claim 5, wherein said storage tank comprises a separation wall for forming said negative pressure producing member accommodating chamber and said sealed chamber, and an ink interface formed by the ink held in said negative pressure producing member is located closer to said supply opening than an area in contact with said communicating portion.

8. A storage arrangement for an ink jet recording head cartridge which includes an ink jet recording head having discharge orifices for discharging ink and a mounting portion for mounting an ink tank replaceably, the ink jet recording head cartridge further having an ink supply tube and an ink reserving portion for directly reserving the ink, the storage arrangement comprising:

a storage container for sealingly carrying said ink jet recording head cartridge;

a storage member, shaped unlike that of said ink tank, mounted on said mounting portion, said storage member having a negative pressure producing member accommodating chamber accommodating a negative pressure producing member for producing negative pressure, and having an atmosphere communicating portion for communicating to the outside of said storage member, said negative pressure producing member being arranged for direct contact with the ink supply tube; and a sealing member for sealing said discharge orifices;

wherein said negative pressure producing member holds more than an amount of ink corresponding to an amount of saturated vapor within said storage container, the ink held in said negative pressure producing member being filled in the ink jet recording head when said storage member is mounted to the mounting portion.

9. A storage arrangement for an ink jet recording head cartridge according to claim 8, wherein the mounting portion has an opening formed with a bottom wall surrounded by a side wall and carrying said storage member, a height of said storage member from said bottom wall not protruding from a top end of said side wall in a state where said storage member is mounted on the mounting portion.

10. A storage arrangement for an ink jet recording head cartridge according to claim 8, wherein the mounting portion has a bottom wall with an opening and first and second opposed side walls extending from said bottom wall, for carrying said storage member detachably, said first side wall having an engagement hole and said second side wall having a stopper opening; and wherein said storage member comprises a pawl-like projection fitting into said stopper hole, a lever elastically supported at an end portion of the storage member opposite a position where the pawl-like projection is provided, a latch pawl provided on said lever to engage said engagement hole, and a stopper for restricting the movable range of said lever in releasing engagement of said latch pawl into said engagement hole.

11. A storage arrangement for an ink jet recording head cartridge according to claim 8, wherein the mounting portion has a bottom wall with an opening and first and second opposed side walls extending from said bottom wall, for carrying said storage member detachably, said first side wall having an engagement hole and said second side wall having a stopper opening; and wherein said storage member comprises a pawl-like projection fitting into said stopper hole, a storage member side wall protruding positioned at an end portion of said storage member opposite a position where said pawl-like projection is provided, a lever having its root elastically supported on said storage member side wall and having its top end extending toward a top end of said storage member side wall, and a latch pawl provided on said lever to engage said engagement hole.

12. A storage arrangement for an ink jet recording head cartridge according to claim 8, wherein a rubber member is disposed around the ink supply tube with a top end portion of the ink supply tube protruding therefrom;

wherein said negative pressure producing member accommodating chamber comprises a convex-shaped annular portion with which said rubber member comes into direct contact when said storage member is mounted to the mounting portion; and wherein the ink supply tube will come into direct contact with said negative pressure producing member with the top end portion entered into the opening of said annular portion.

13. A storage method for storing an ink jet recording head cartridge in a sealed space, said ink jet recording head cartridge having an ink jet recording head with discharge orifices for discharging ink and a mounting portion for mounting an ink tank replaceably, said method comprising:

mounting a storage tank on said mounting portion, said storage tank having a negative pressure producing member accommodating chamber which includes a negative pressure producing member for producing negative pressure, an atmosphere communicating portion for communicating to the outside of said storage tank, and a supply opening for communicating to said ink jet recording head, and said storage tank having a sealed chamber which includes a communicating portion for communicating to said negative pressure producing member accommodating chamber and which forms a space sealed from the outside, except for said communicating portion; and sealing said discharge orifices with a sealing member; and sealingly storing said ink jet recording head cartridge in a sealed space of a storage container, together with the mounted storage tank and the sealed discharge orifices;

wherein only the negative pressure producing member of said negative pressure producing member accommodating chamber produces the negative pressure to said ink jet recording head, and holds ink so that said sealed chamber can substantially secure a communicating state to said sealed space through said atmosphere communicating portion.

* * * * *

UNITED STATES PATENT AND TRADEMARK OFFICE

CERTIFICATE OF CORRECTION

PATENT NO. : 6,247,598 B1
DATED : June 19, 2001
INVENTOR(S) : Ken Hosaka et al.

It is certified that error appears in the above-identified patent and that said Letters Patent is hereby corrected as shown below:

Column 2,
Line 34, change "increase." to -- increases. --.

Column 6,
Line 55, change "head" to -- the head --.

Column 8,
Line 8, change "a" to -- an --.

Column 14,
Line 36, change "Sa" to -- 5a --.

Column 17,
Line 52, change "Jet" to -- jet --.

Column 19,
Line 9, change "head," to -- head --;
Line 46, change "the" to -- said --; and
Line 47, change "said" to -- the --.

Column 21,
Line 5, change "portion; and" to -- portion; --

Signed and Sealed this

Thirtieth Day of April, 2002

*Attest:*

JAMES E. ROGAN
*Director of the United States Patent and Trademark Office*

*Attesting Officer*